(12) United States Patent
Hinds

(10) Patent No.: US 8,230,669 B2
(45) Date of Patent: *Jul. 31, 2012

(54) BASECUTTER ASSEMBLY FOR A CANE HARVESTER

(75) Inventor: Michael L. Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,300

(22) Filed: Nov. 10, 2010

(65) Prior Publication Data

US 2012/0110968 A1    May 10, 2012

(51) Int. Cl.
*A01D 45/02* (2006.01)

(52) U.S. Cl. .......................................... 56/53

(58) Field of Classification Search .......... 56/13.5–13.9, 56/53, 56–59, 62, 63, 101–103, 119, 121.43–121.46, 56/500, 503, 14.9–15.3, 327.1, 327.2; 460/134–137
See application file for complete search history.

(56) References Cited

U.S. PATENT DOCUMENTS

| | | | | |
|---|---|---|---|---|
| 3,002,330 A * | 10/1961 | Thomson | ........................ | 56/13.7 |
| 3,434,271 A * | 3/1969 | Fogels et al. | ........................ | 56/60 |
| 4,035,996 A * | 7/1977 | Fernandez et al. | .............. | 56/13.9 |
| 4,070,809 A * | 1/1978 | Soulat | ............................ | 56/13.9 |
| 4,098,060 A * | 7/1978 | Quick | ............................. | 56/13.9 |
| 4,170,098 A * | 10/1979 | Moreno et al. | .................. | 56/13.9 |
| 4,194,344 A * | 3/1980 | Mizzi | .............................. | 56/13.9 |
| 4,270,337 A * | 6/1981 | Pinto | ............................... | 56/13.9 |
| 4,386,492 A * | 6/1983 | Tilby | .............................. | 56/13.9 |
| 4,574,567 A * | 3/1986 | Morellini | ....................... | 56/16.5 |
| 4,646,512 A * | 3/1987 | Scott et al. | ...................... | 56/13.9 |
| 4,897,986 A * | 2/1990 | Baker et al. | ..................... | 56/13.9 |
| 5,129,219 A * | 7/1992 | Baker | .............................. | 56/53 |
| 5,191,759 A * | 3/1993 | Baker | .............................. | 56/500 |
| 5,463,856 A * | 11/1995 | Beckwith | .......................... | 56/62 |
| 6,230,477 B1 * | 5/2001 | Caillouet | ........................ | 56/14.5 |
| 6,272,820 B1 * | 8/2001 | Otten et al. | ..................... | 56/13.9 |
| 6,363,700 B1 * | 4/2002 | Fowler | ............................ | 56/13.9 |
| 7,805,916 B2 * | 10/2010 | Hinds et al. | ........................ | 56/62 |
| 2010/0307121 A1 * | 12/2010 | Marchini | ........................... | 56/63 |

* cited by examiner

Primary Examiner — Thomas B Will
Assistant Examiner — Mai Nguyen

(57) ABSTRACT

A stalk processing section of a harvester for harvesting stalks of stalk-like plants, the harvester has a main frame that is moveably coupled to an undercarriage. The stalk processing section includes a basecutter assembly movably coupled to the main frame. The basecutter assembly includes a knockdown roller, a butt lifter roller and/or an upper feed roller. The basecutter assembly also includes a set of rails and a set of wheels. The set of wheels engage the set of rails. The set of rails are attached to the main frame and/or the basecutter assembly. The set of wheels are rotatably coupled to the main frame and/or the basecutter assembly. The set of rails and the set of wheels are configured to constrain movement of the basecutter assembly along a path established by the rails and the wheels.

19 Claims, 4 Drawing Sheets

BASECUTTER ASSEMBLY FOR A CANE HARVESTER

FIELD OF THE INVENTION

The present invention relates to agricultural harvesters, and, more particularly, to harvesters for the harvesting of stalk-like crops.

BACKGROUND OF THE INVENTION

Two known types of stalk-like crops in the North American market are sugarcane and sorghum. Other stalk-like or cane-like crops have been receiving increasing attention in bioenergy circles, such as miscanthus, energy cane, and giant reed. During the harvesting of sugarcane, it is known to top the sugarcane plant by cutting off the top portion of the plant using a separate cutter head and allowing the top of the plant to simply fall to the ground.

Sorghum is a major cereal grain that is one of the oldest known crops and is used as a staple food in many parts of Africa and Asia. Sorghum is a major feed grain crop in the US, Mexico, Argentina, Australia, and. South Africa. It is believed that sorghum was introduced into the United States in the 1700's and some believe that Benjamin Franklin introduced the first grain sorghum crop. The seed of grain sorghum is the smallest of the major spring-planted field crops, such as corn and soybeans.

Both sugarcane and sorghum are members of the grass family. Sugarcane is native to warm, temperate to tropical regions, the cane having stout, jointed, fibrous stalks that are rich in sugar and measure six to nineteen feet tall. Sugarcane is able to convert up to two percent of the incident solar energy into biomass. Once sugarcane is planted, a stand can be harvested several times. After each harvest, the cane sends up new stalks called rattons. Each successive harvest produces a decreasing yield, eventually leading to a replanting operation.

The harvesting of sugarcane includes the cutting of the cane at the base of the stalk, stripping the leaves, chopping the cane into consistent lengths, and depositing the cane into a transporting device. The harvester typically blows the leaves and such back onto the ground.

Sugarcane harvesting machines utilize a basecutter device that is integral with the main frame of the machine. The height of the cut is regulated by the raising and lowering of the main portion of the machine attached to a mainframe. The adjustment of the cutting height also caused the adjustment in the height of the rest of the machine, including the operator's cab, which can cause discomfort to the operator as the harvester, along with the operator, is moved up and down by frequent adjustments in cutting height. This is particularly a problem on machines that use some sort of automatic basecutter height adjustment.

A device by Copersucar of Brazil was tried several years ago that separated the basecutter box from the main frame of the harvester. The intent of this was to make the basecutter float. The basecutter was mounted on pivoting arms that had a spring, allowing the movement of the basecutter. The bottom of the cutting disk had a bell-shape for riding on the ground in an attempt to regulate cutting height.

What is needed in the art is an improved and efficient height adjustment for the basecutter and some associated rollers of a stalk plant harvester.

SUMMARY

The invention in one form is directed to a harvester for harvesting stalks of stalk-like plants, the harvester including a main frame, an undercarriage, at least one ground contacting propulsion device, and a basecutter assembly. The undercarriage is coupled to the main frame. The ground contacting propulsion device is connected to the undercarriage. The basecutter assembly is moveably coupled to the main frame. The basecutter assembly includes a knockdown roller, a butt lifter roller and/or an upper feed roller. The basecutter assembly is not pivotally coupled to the main frame.

The invention in another form is directed to a stalk processing section of a harvester for harvesting stalks of stalk-like plants, the harvester has a main frame that is moveably coupled to an undercarriage. The stalk processing section includes a basecutter assembly movably coupled to the main frame. The basecutter assembly includes a knockdown roller, a butt lifter roller and/or an upper feed roller. The basecutter assembly also includes a set of rails and a set of wheels. The set of wheels engage the set of rails. The set of rails are attached to the main frame and/or the basecutter assembly. The set of wheels are rotatably coupled to the main frame and/or the basecutter assembly. The set of rails and the set of wheels are configured to constrain movement of the basecutter assembly along a path established by the rails and the wheels.

BRIEF DESCRIPTION OF THE DRAWINGS

The above-mentioned and other features and advantages of this invention, and the manner of attaining them, will become more apparent and the invention will be better understood by reference to the following description of embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION

Figure 1:
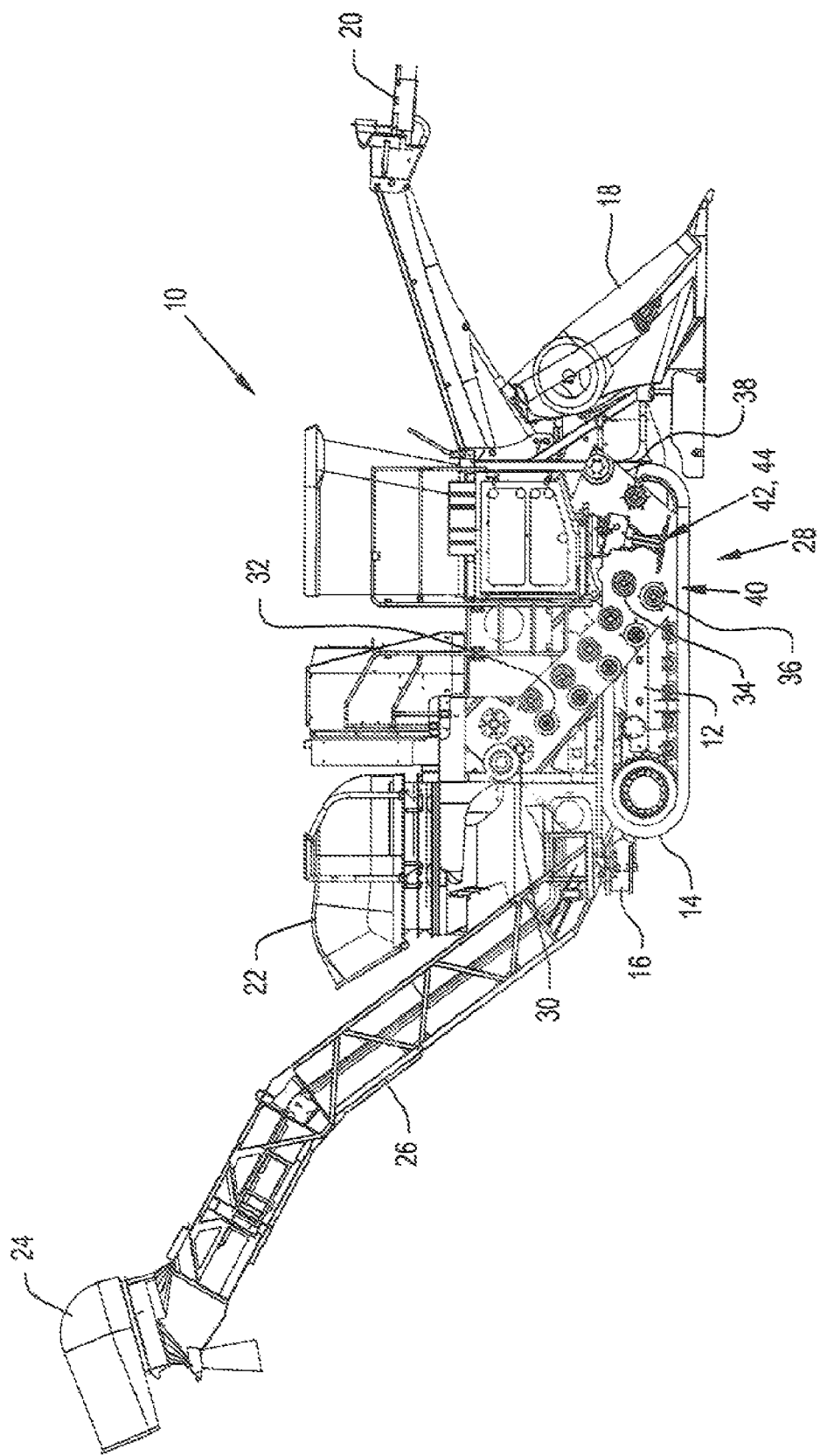
FIG. 1 is a side view of an embodiment of an agricultural harvester of the present invention, having a cutout section to illustrate a basecutter assembly of the present invention.

Referring now to the drawings, and more particularly to FIG. 1, there is shown an embodiment of an agricultural work machine in the form of a harvester 10 for the harvesting of stalk-like crops. Harvester 10 includes an undercarriage 12 having a ground contacting propulsion system 14 attached thereto. A main frame 16 is movably connected to undercarriage 12, allowing elevation of most of harvester 10 by the elevating of main frame 16 above undercarriage 12 to a desired position. Harvester 10 additionally includes crop dividers 18, a topper 20, a primary extractor 22, a secondary extractor 24, an elevator 26, and a stalk processing section 28. Topper 20 cuts off the upper portion of the crop, either allowing it to fall on the ground or moving it to another portion of the machine for further processing. Primary extractor 22 blows the lighter weight leafy material from harvester 10. Secondary extractor 24 provides another flow of air to remove lighter weight material from the processed crop stalks. Elevator 26 moves chopped pieces of stalk from the main portion of harvester 10 rearward and toward a stalk holding device, such as a wagon (not shown).

Stalk processing section 28 includes chopper knives 30, feed rollers 32 and basecutter assembly 40. A specific upper feed roller 34, a butt lift roller 36, a knockdown roller 38, cutters 42 and 46 are a part of basecutter assembly 40. As cane moves into harvester 10, knockdown roller 38 of basecutter assembly 40 functions to knockdown a portion of the cane before it meets cutters 42 and 46. After the cane is cut, then butt lifter roller 36 lifts up the butt end of the cane so that it can engage upper feed roller 34 and subsequent feed rollers 32. As the cane is moved further into stalk processing section 28 and encounters chopper knives 30 that chop the stalk into substantially uniform lengths and passes the material toward primary extractor 22 as it proceeds to leave harvester 10 for being deposited into the wagon (not shown).

Figure 2:
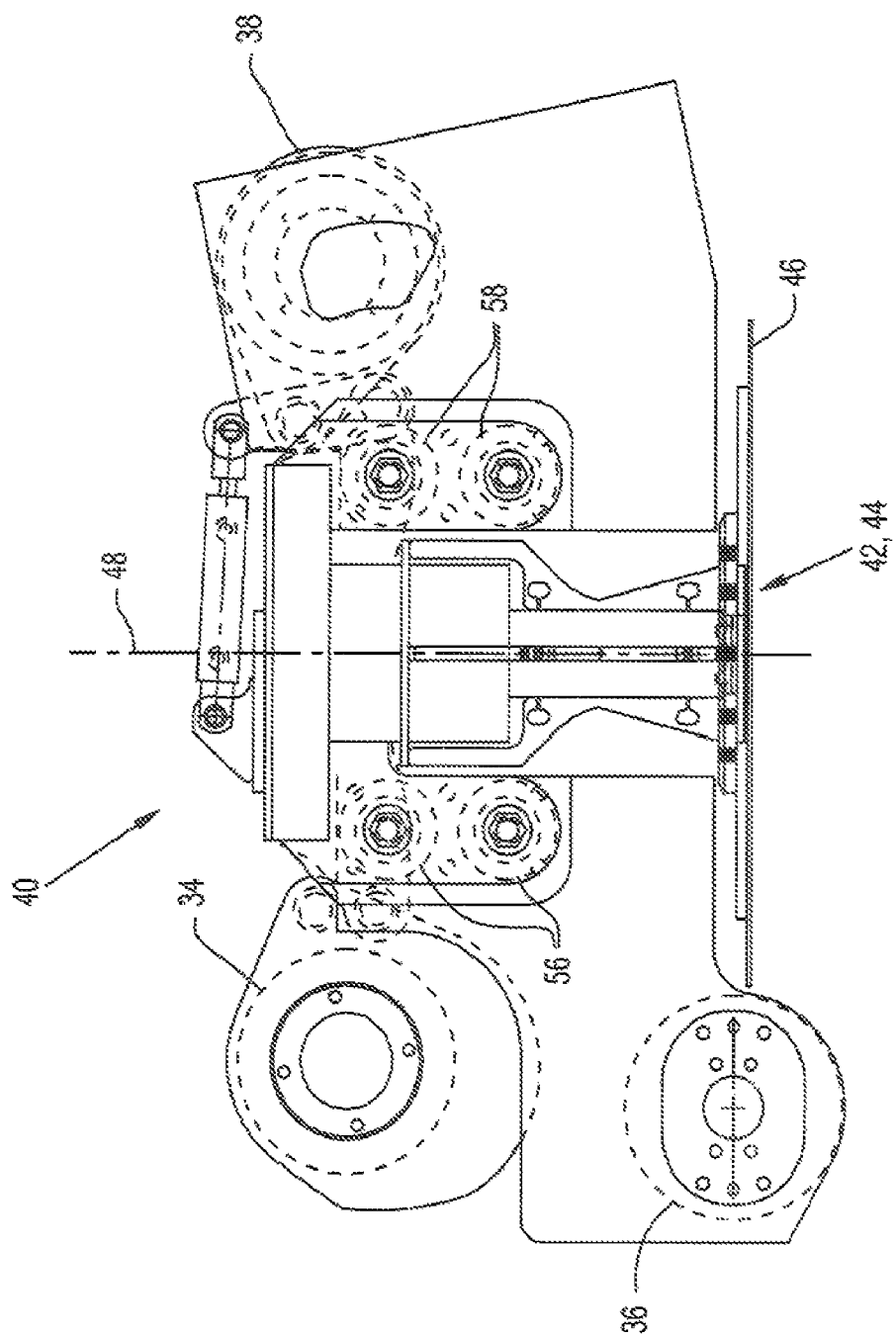
FIG. 2 is a side view of the basecutter assembly of FIG. 1.
Figure 3:
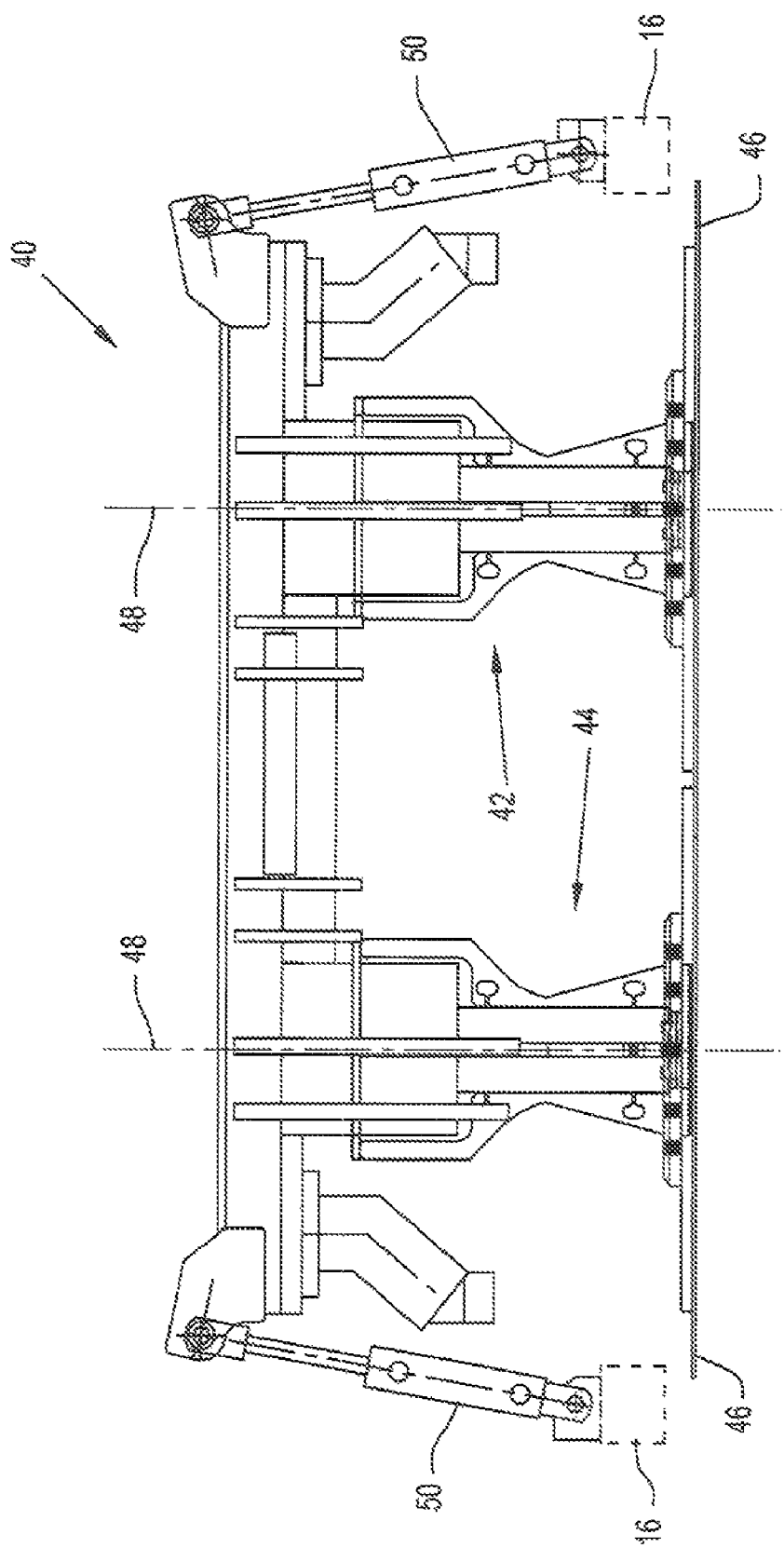
FIG. 3 is an end view of the basecutter assembly of FIG. 2.
Figure 4:
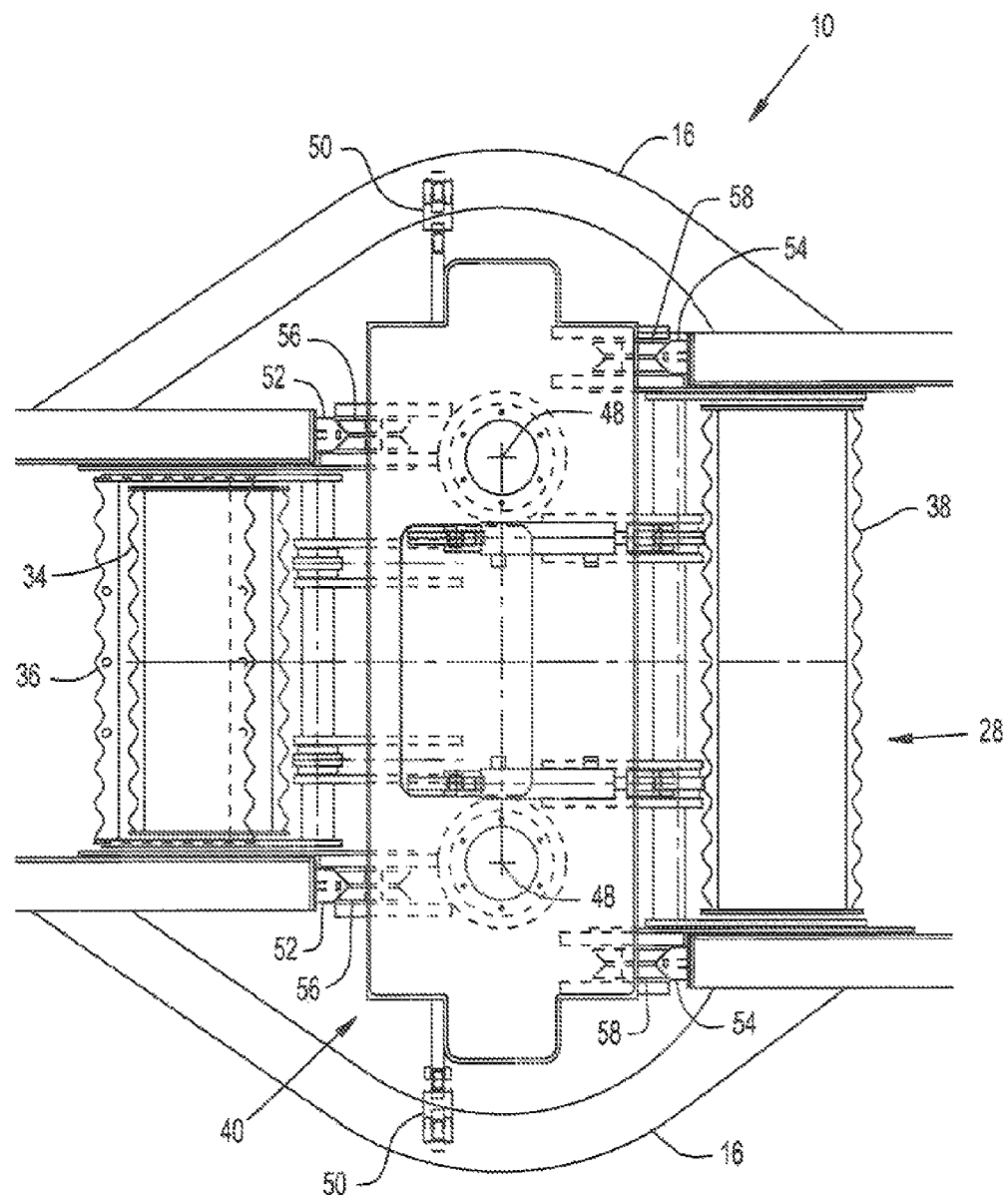
FIG. 4 is a top view of the basecutter assembly of FIGS. 2 and 3.

Now, additionally referring to. FIGS. 2-4, basecutter assembly 40 includes a first cutter 42, a second cutter 44, each having a rotating blade 46. Basecutter assembly 40 here, for purposes of clarity, additionally includes upper feed roller 34, butt lifter roller 36 and/or knockdown roller 38. At least one of rollers 34, 36 or 38 are coupled with cutters 42 and 44 so as to move with cutters 42 and 46. Rotating blades 46 rotate about axes 48. Basecutter assembly 40 has actuators 50 connected therefrom to main frame 16 for the adjustment of basecutter assembly 40 relative to main frame 16. Actuators 50 may be in the form of hydraulic cylinders located on each side of basecutter assembly 40. While one basecutter assembly 40 is illustrated and discussed, it is contemplated that there may be more than one basecutter assembly 40 in harvester 10. Basecutter assembly 40 also includes a first set of rails 52, a second set of rails 54, a first set of wheels 56, and a second set of wheels 58. For the sake of simplicity, wheels 56 and 58 as well as rails 52 and 54 could have their locations interchanged. However, for the sake of clarity and for illustration of the present invention, rails 52 and 54 are positioned and coupled to main frame 16. Wheels 56 and 58 are attached to basecutter assembly 40 to thereby allow basecutter assembly 40 to move along a path established by rails 52 and 54. Rails 52 and 54 may be shaped as shown in the figures and wheels 56 and 58 are shaped to accommodate the shape of rails 52 and 54 to substantially allow only movement along the path established by rails 52 and 54. The path established by rails 52 and 54 may be a substantially linear path and may be parallel to axes 48. Additionally, rails 52 may be positioned with a different width than rails 52, as illustrated in FIG. 4.

Basecutter assembly 40 is moveable relative to main frame 16 in a generally vertical direction. A generally vertical direction is described as being with 15 degrees of a vertical axis. The movement of basecutter assembly 40 along a path established by rails 52 and 54 is in a generally linear direction and may be more particularly positioned at approximately twelve degrees from the vertical axis in a forward direction, the upper part of the axis 48 being tilted towards the harvesting direction, which is from left to right as shown in FIG. 1. The set of wheels 56 and 58, respectively, engage a set of rails 52 and 54 to constrain movement of basecutter assembly 40 along the path established by the sets of rails 52, 54 and wheels 56, 58. Again, although the wheels 56 and 58 are associated with basecutter assembly 40, wheels 56 and 58 can alternately be positioned on main frame 16 versus basecutter assembly 40. In the present invention, basecutter assembly 40 moves independent of main frame 16 along the path established over a predetermined, adjustable length of travel. Basecutter assembly 40 moves as a unit, including rollers 34, 36 and 38, along the established path and does not pivot relative to main frame 16 as it travels the established path. Although basecutter assembly 40 is not pivotally connected to main frame 16, knockdown roller 38 may be pivotable relative to the rest of basecutter assembly 40.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A harvester for harvesting stalks of stalk-like plants, said harvester comprising:
   a main frame;
   an undercarriage coupled to said main frame;
   at least one ground contacting propulsion device connected to said undercarriage;
   a basecutter assembly moveably coupled to said main frame, said basecutter assembly including at least one of a knockdown roller, a butt lifter roller and an upper feed roller, said basecutter assembly being not pivotally coupled to said main frame
   a set of rails; and
   a set of wheels engaging said set of rails, said set of rails being attached to one of said main frame and said basecutter assembly, said set of wheels being rotatably coupled to the other one of said main frame and said basecutter assembly, said set of rails and said set of wheels being configured to constrain movement of said basecutter assembly along a path established by said set of rails and said set of wheels.

2. The harvester of claim 1, wherein said basecutter assembly is movable relative to said main frame in a generally vertical direction.

3. The harvester of claim 2, wherein said generally vertical direction is within 15° of a vertical axis.

4. The harvester of claim 3, wherein said basecutter assembly is movable in a generally linear direction.

5. The harvester of claim 4, wherein said linear direction is approximately 12° from said vertical axis.

6. The harvester of claim 5, wherein the harvester has a harvesting direction, said linear direction being tilted toward the harvesting direction.

7. The harvester of claim 6, wherein said main frame is movable relative to said undercarriage.

8. The harvester of claim 1, wherein said set of wheels are rotatably coupled to said basecutter assembly, said rails being attached to said main frame.

9. The harvester of claim 1, wherein said path is substantially linear, said basecutter assembly including each of said knockdown roller, said butt lifter roller and said upper feed roller.

10. The harvester of claim 9, further comprising at least one actuator connected to said main frame and to said basecutter assembly, said at least one actuator controlling a position of said basecutter assembly relative to said main frame.

11. A stalk processing section of a harvester for harvesting stalks of stalk-like plants, the harvester having a main frame that is movably coupled to an undercarriage, the stalk processing section comprising:
   a basecutter assembly moveably coupled to the main frame, said basecutter assembly including at least one of a knockdown roller, a butt lifter roller and an upper feed roller;

a set of rails; and a set of wheels engaging said set of rails, said set of rails being attached to one of the main frame and said basecutter assembly, said set of wheels being rotatably coupled to the other of the main frame and said basecutter assembly, said set of rails and said set of wheels being configured to constrain movement of said basecutter assembly along a path established by said set of rails and said set of wheels.

12. The stalk processing section of claim 11, wherein said basecutter assembly is movable relative to the main frame in a generally vertical direction.

13. The stalk processing section of claim 12, wherein said generally vertical direction is within 15° of a vertical axis.

14. The stalk processing section of claim 13, wherein said path is in a generally linear direction.

15. The stalk processing section of claim 14, wherein said linear direction is approximately 12° from said vertical axis.

16. The stalk processing section of claim 15, wherein the harvester has a harvesting direction, said linear direction being tilted toward the harvesting direction.

17. The stalk processing section of claim 16, wherein said set of wheels are rotatably coupled to said basecutter assembly, said rails being attached to said main frame.

18. The stalk processing section of claim 17, further comprising at least one actuator connected to said main frame and to said basecutter assembly, said at least one actuator controlling a position of said basecutter assembly relative to said main frame.

19. The stalk processing section of claim 11, wherein said basecutter assembly includes each of said knockdown roller, said butt lifter roller and said upper feed roller.

* * * * *